United States Patent [19]

Bryant, Jr. et al.

[11] 4,123,107
[45] Oct. 31, 1978

[54] INTEGRATED SULFUR MINING - SULFURIC ACID PRODUCTION SYSTEM

[75] Inventors: Raymond G. Bryant, Jr.; Clifford M. Cockrell, both of New Orleans, La.

[73] Assignee: Freeport Minerals Company, New York, N.Y.

[21] Appl. No.: 765,236

[22] Filed: Feb. 3, 1977

[51] Int. Cl.² .................. E21B 43/28; E21C 41/14
[52] U.S. Cl. ................................... 299/6; 423/522
[58] Field of Search ........................... 299/6; 423/522

[56] References Cited

U.S. PATENT DOCUMENTS

| | | | |
|---|---|---|---|
| 461,429 | 10/1891 | Frasch | 299/6 |
| 2,991,987 | 7/1961 | Heinze | 299/6 |
| 3,653,828 | 4/1972 | Connor et al. | 423/522 |

OTHER PUBLICATIONS

Olson, Unit Processes & Principles of Chemical Engineering, 1932, cover and pp. 1-3.

Primary Examiner—Ernest R. Purser
Attorney, Agent, or Firm—Fisher, Christen & Sabol

[57] ABSTRACT

An integrated sulfur mining — sulfuric acid production system is provided wherein a portion of the sulfur produced in the mining operation is consumed in a sulfuric acid manufacturing plant which also generates sufficient heat to raise the temperature of the aqueous mining fluid to the level required by a mining operation of the type that uses the Frasch sulfur mining technique.

9 Claims, 2 Drawing Figures

INTEGRATED SULFUR MINING - SULFURIC ACID PRODUCTION SYSTEM

BACKGROUND OF THE INVENTION

1. Field of the Invention

The present invention relates to the mining of sulfur and to the production of sulfuric acid. More particularly, it relates to the integration of the production of sulfuric acid by the contact process and the mining of sulfur from underground deposits by the Frasch process.

2. Description of the Prior Art

Both the contact process for manufacturing sulfuric acid and the Frasch process for mining sulfur are well known to those skilled in these arts, and descriptions of their operations may be found in the patent literature and in numerous chemistry books and encyclopedias including, for example, the *Kirk-Othmer Encyclopedia of Chemical Technology*, Second Edition, Vol. 19, pp. 337–348 and 460–482, John Wiley & Sons, Inc., 1969. In the contact process for producing sulfuric acid, sulfur dioxide ($SO_2$) produced, for example, from the burning of elemental sulfur, is converted to sulfur trioxide ($SO_3$) with the aid of a catalyst such a vanadium pentoxide, and the $SO_3$ is absorbed in dilute sulfuric acid to produce a strong, hot product acid which is then cooled prior to storage and shipment for use. In the Frasch process for mining sulfur, a hot aqueous mining fluid, e.g., water, is used to melt the solid sulfur present in an underground sulfur-bearing formation by injecting the fluid, heated under pressure to around 325° F., through the annulus formed by two concentric pipes and using compressed air to lift the molten sulfur to the surface through the center pipe. The air is usually forced down through a small diameter pipe located within the described concentric arrangement.

Until recent years, the source of heat for the operation of a Frasch process sulfur mine has been the relatively abundant, low-cost supply of natural gas. However, as these reserves dwindle and gas supplies, when available, soar in price, it is becoming increasingly necessary to resort to the use of other fuels such as oil or coal. The use of either of these latter materials, though presently readily available, is also extremely costly. The price of imported oil has risen drastically and its continued availability is subject to question and concern. Coal is readily available domestically but it is very costly, if even possible, to convert existing gas-fired boilers to those firing coal and oil. The presence of sulfur as a contaminant in the oil and coal also presents disadvantages from the standpoint of possible air pollution, as well as from the standpoint of water-treating problems in those mining plants wherein the combustion gases from the boilers directly contact the incoming cold mining fluid. In the latter situation, the $SO_2$ formed is absorbed by the water and may reduce the pH to the corrosive range and require the corrective addition of costly soda ash, or the concentration of sulfite in the water may increase to the point at which excessive calcium sulfite scaling occurs in heat exchangers and other water-handling equipment of the facility.

SUMMARY OF THE INVENTION

It is therefore a primary object of the present invention to provide an integrated sulfur mine-sulfuric acid plant system.

It is another object of the present invention to provide such an integrated system using sulfur as the primary energy source and wherein the sulfur mine is operated according to the Frasch technique and the sulfuric acid plant is operated under the contact process.

It is still another object of the present invention to provide such a system which is free of the water treatment problems and vagaries of cost, quality, and adequate supply of fuel currently associated with the use of fuels such as natural gas, fuel oil, or coal in Frasch mining operations.

It is a further object of the present invention to provide such an integrated system wherein the heat generated within the acid plant can be recovered and used in operation of the sulfur mine.

It is a still further object of this invention to provide such a system wherein seawater can be used as the aqueous mining fluid for recovering sulfur from underground deposits thereof.

Still further objects and the entire scope of applicability of the present invention will become apparent from the drawings and detailed description given hereinafter; it should be understood, however, that the drawings and detailed description, while indicating preferred embodiments of the invention, are given by way of illustration only, since various changes and modifications within the spirit and scope of the invention will become apparent to those skilled in the art therefrom.

It has been found that the above objects may be attained by an integrated Frasch sulfur mine-contact process sulfuric acid plant system wherein the various streams of hot gases within the acid plant are cooled to within optimum temperature ranges commensurate with maximum efficiency in the conversion of sulfur to sulfuric acid and, at the same time, the heat released by the cooling of said streams of hot gases is recovered and used to raise the temperature of the aqueous mining fluid to that required by the Frasch sulfur mining technique. The present invention provides a system wherein high-pressure steam, generated by means of conventional heat exchange equipment such as waste-heat boilers, steam superheaters, boiler feedwater economizers, etc., by the recovery of heat from hot acid plant gases, is used to drive, for example, steam turbines connected to electric generators which produce electricity for use in the acid plant, and to operate pumps, air compressors and various other pieces of equipment needed in the operation of the integrated facility. This high-pressure steam and the exhaust steam from the steam turbines are then employed to heat the aqueous mining fluid to the required temperature (usually around 325° F.) in indirect heat exchangers, herein referred to as low-pressure and high-pressure heaters, and the resultant condensate recycled as feedwater to heat reclaiming units and to a water boiler. Prior to reaching mining temperature in said low-pressure and high-pressure heaters, the mining fluid, which in the preferred embodiment consists of cold seawater, is preheated to an intermediate temperature (around 180° F.) in indirect heat exchangers, herein referred to as indirect acid coolers, by a stream of hot sulfuric acid from the acid plant. The resultant cooled acid leaves the indirect acid coolers at a temperature of about 170°–185° F., and preferably 180° F., and is returned to the acid plant. The acid plant produces a concentrated sulfuric acid having a strength of about 98% $H_2SO_4$. The concentrated product acid is normally further cooled before sending it to storage.

The integrated sulfur mining and sulfuric acid manufacturing system of the invention broadly comprises injecting a "superheated aqueous mining fluid" into an underground sulfur formation to obtain mined sulfur in the molten state, oxidizing the molten sulfur to produce sulfur dioxide, catalytically converting the sulfur dioxide to sulfur trioxide, absorbing the sulfur trioxide in diluted sulfuric acid to obtain an acid of predetermined strength, and utilizing at least a portion of the heat generated by the oxidation and catalytic conversion to heat the aqueous mining fluid to a temperature above the melting point of sulfur. As used throughout the Frasch sulfur mining industry, and as used in this detailed description, the term "superheated aqueous mining fluid" means an aqueous fluid, e.g., water, that has been heated under pressure to a temperature higher than the normal melting point of sulfur, i.e., higher than about 250° F. In one preferred embodiment, hot gases resulting from the oxidation and catalytic conversion are brought into indirect contact with water whereby the hot gases are cooled and the water is heated and converted into steam, and the steam is used to heat the aqueous mining fluid. In another preferred embodiment, at least a portion of the steam is first used to generate electrical and mechanical energy and the exhaust steam from the energy generation is then used to heat the aqueous mining fluid. In both of these preferred embodiments, the steam may be condensed and the resulting condensate may be recycled for said contact with hot gases. In still another preferred embodiment, a portion of the heat contained in the hot gases resulting from the oxidation and catalytic conversion is first transferred to the sulfuric acid in an absorption tower and then transferred to the aqueous mining fluid in an operation where the aqueous mining fluid is brought into indirect contact with the hot sulfuric acid whereby the sulfuric acid is cooled and the aqueous mining fluid is preheated.

BRIEF DESCRIPTION OF THE DRAWING

As shown in FIG. 1, the integrated system of the present invention broadly involves contact process sulfuric acid plant 24 which is served by molten sulfur from sulfur storage tank 20, indirect acid coolers 28, deaerating feedwater heater 86, low-pressure and high-pressure heaters 82 and 72, turbine-generator 52, other turbine-driven equipment 56, water boiler 46 and pH-adjustment apparatus 40. Boiler feedwater is fed through line 114 to acid plant 24 from deaerating feedwater heater 86. Steam produced in acid plant 24 is fed through line 42 to turbine-generator 52 and other mechanical turbine-driven equipment 56, the exhaust steam from which is supplied to low-pressure heater 82 and high-pressure heater 72.

DESCRIPTION OF THE PREFERRED EMBODIMENTS

Figure 1:
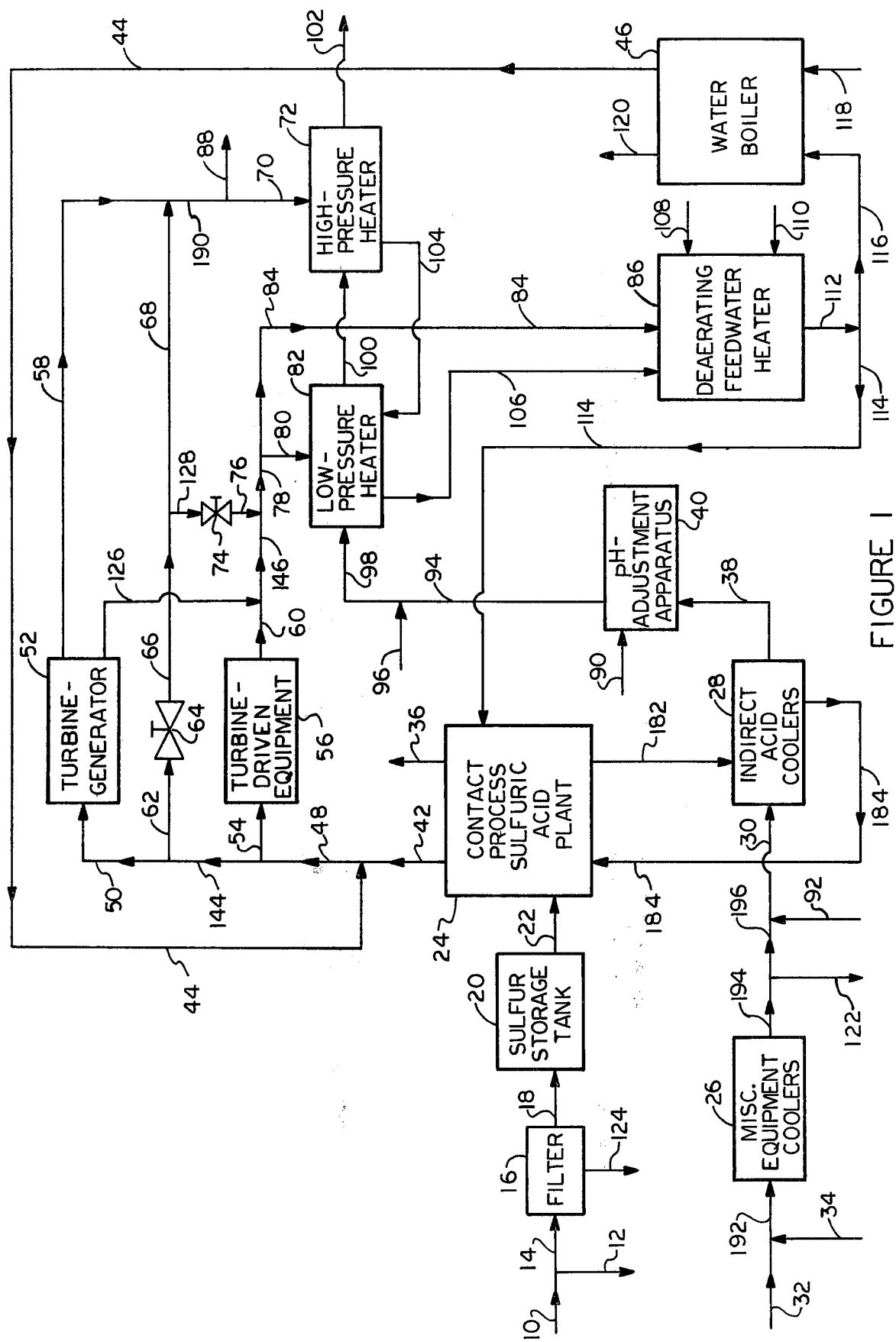
FIG. 1 is a schematic flowsheet of a preferred embodiment of the integrated sulfur mining-sulfuric acid production system of the present invention.

In one preferred embodiment of the present invention the system is employed as the integrated sulfuric acid plant-sulfur mining operation illustrated in FIG. 1, using seawater or a mixture of seawater and brine as the aqueous mining fluid. It will be understood, however, that minor variations in the system of FIG. 1 are possible, and will become apparent to those familiar with these types of operations from the description that follows, without departing from the basic concept of the invention. For example, fresh water, or a combination of fresh water and seawater, or even "bleedwater", may be used as mining fluid instead of seawater or seawater-brine mixture. "Bleedwater" is a term used in the Frasch sulfur mining industry to denote the water that must be bled from the sulfur mine formation to control the mine pressure. This water is normally treated and pumped to waste. Also, the preferred combination of a low-pressure heater and a high-pressure heater (heat exchangers) to raise the temperatures of the aqueous mining fluid (booster water) to its required mining temperature level may be replaced by a single heat exchanger or, in some cases, by even more than two heat exchangers if justified by the heat balances and economics of the operations.

Referring now particularly to FIG. 1, "run-of-mine" sulfur, that is, raw molten sulfur mined by the Frasch process, is introduced into the integrated system through line 10. A portion of this molten sulfur can be drawn from the integrated system through line 12 as "sales sulfur". The remaining portion (e.g., about 40% of the total mine production) is fed through line 14 to filter 16 wherein it is filtered before being fed through line 18 to sulfur storage tank 20. The filter cake removed from filter 16 through line 124 contains salt and other undesirable particulate matter that might otherwise plug the sulfur burners and foul the catalyst beds of the converters in the sulfuric acid plant, as will be hereinafter more fully described, if left in the molten sulfur. It should be understood, however, that if the molten sulfur does not contain any substantial amounts of salt and/or other particulate matter, i.e., if it contains less than about 5 ppm suspended matter, filter 16 will not be needed, and the molten sulfur will be fed directly through lines 14 and 18 to sulfur storage tank 20. Filter 16 is located upstream from sulfur tank 20 so as to provide a supply of sulfur in the tank for use in the sulfuric acid plant during filter clean-up periods even when no filtered sulfur is being currently produced.

The filtered sulfur is fed through line 18 to sulfur storage tank 20, which is heated, e.g., by steam, prior to entering contact process sulfuric acid plant 24. During steady-state operations a relatively continuous stream of sulfur is produced by the sulfur wells, but storage tank 20 is needed to insure a supply of sulfur to sulfuric acid plant 24 during periods of low sulfur production, and during filter clean-up periods.

Figure 2:
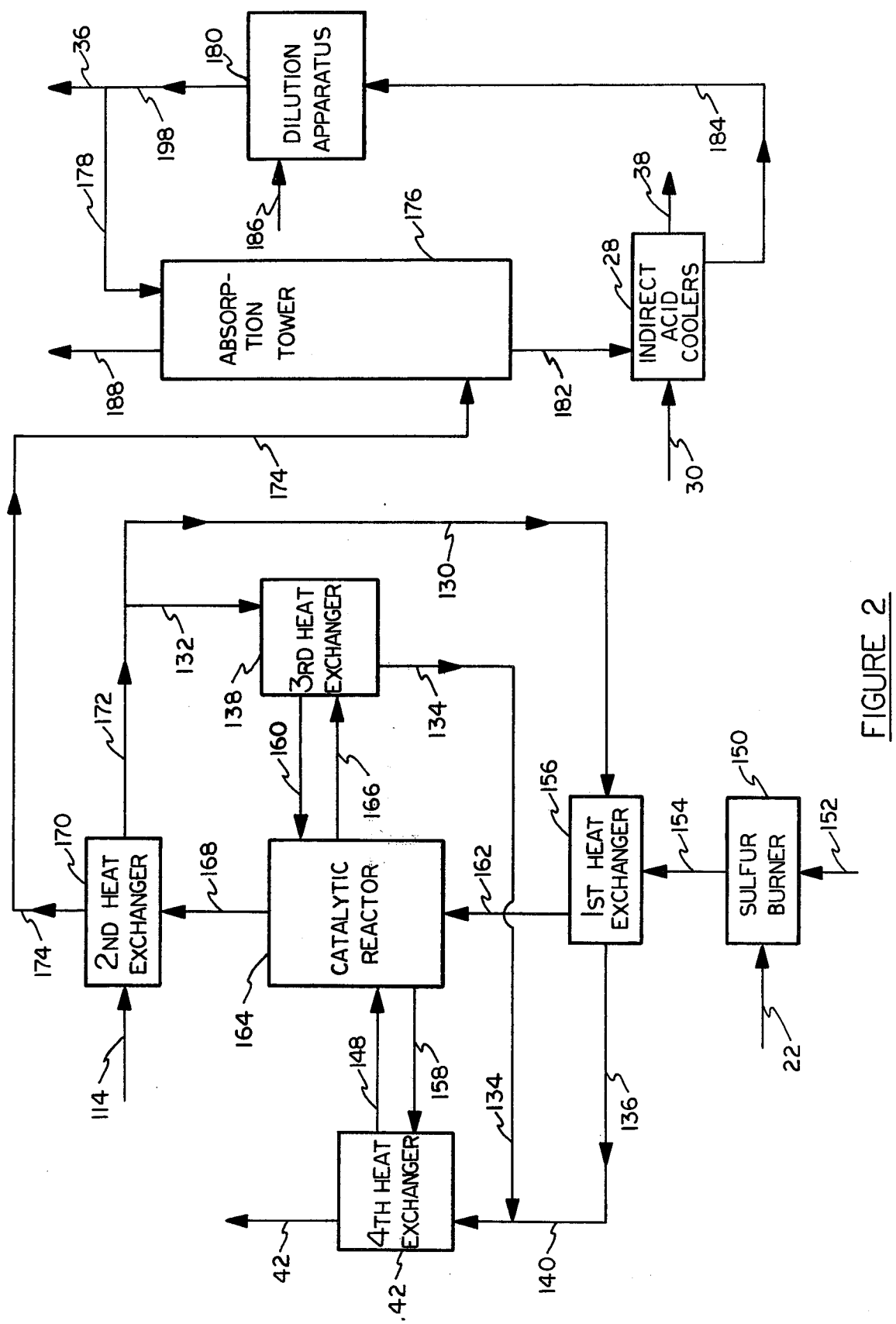
FIG. 2 is a schematic flowsheet of a preferred embodiment of a sulfuric acid production plant for use in the integrated system of FIG. 1.

From storage tank 20, sulfur is fed through line 22 to contact process sulfuric acid plant 24 wherein concentrated sulfuric acid is produced by the contact process. A simplified version of such a plant is shown in FIG. 2. In the plant, as shown in FIG. 2, molten sulfur (from storage tank 20 in FIG. 1) is fed through line 22 to sulfur burner 150 wherein it is burned with dry air fed through line 152 to produce $SO_2$ gases which exit through line 154. The dry air may be obtained by drying atmospheric air with strong sulfuric acid in a conventional spray dryer (not shown). The sulfuric acid and absorbed water obtained from the dryer may be combined with one of the other sulfuric acid streams in the plant, e.g., that in line 184. Preferably, enough air is supplied through line 152 to oxidize the molten sulfur to sulfur dioxide and to catalytically convert the sulfur dioxide to sulfur trioxide in catalytic reactor 164, as will be explained hereinafter. Alternatively, the air needed for the catalytic conversion in catalytic reactor 164 may be supplied separately and directly into one of the beds of reactor 164. The $SO_2$ gases made in sulfur burner 150, which have a temperature of from about 1750° to 2100° F. e.g., about 1800° F., are passed from line 154 through first heat exchanger 156, which is a waste-heat boiler and wherein steam having a pressure of from about 600 to about 700 pounds per square inch, gauge (psig), e.g., about 650 psig, is generated from water fed through lines 114, 172 and 130, the original source of which is deaerating feedwater heater 86 of FIG. 1. The generated steam is passed through line 136 to line 140 and is then fed, together with the steam in line 134 generated in third heat exchanger 138, to fourth heat exchanger 142, which is a steam superheater. The steam fed to the superheater through line 140 has a pressure of from about 600 to about 700 psig, e.g., 650 psig. This steam is superheated in fourth heat exchanger 142° to about 600° TTF. (Total temperature ° F.), and is then used, as high pressure steam passed through line 42, to drive turbine-generator 52 of FIG. 1. The gases leaving first heat exchanger 156 at a temperature of from about 815° to about 830° F., e.g., about 825° F., are fed through line 162 and oxidized to $SO_3$ in catalytic reactor 164, using a catalyst such as platinum or vanadium pentoxide. Catalytic reactor 164 is a multistage packed-bed-type reactor wherein the catalyst is usually provided in several horizontal trays, or "beds", placed in series. Normally, two or three of these beds, or stages, are used, and the percentage of conversion of $SO_2$ to $SO_3$ increases with the number of stages used. From catalytic reactor 164 the oxidized gases having a temperature of from about 810° to about 825° F., e.g., about 820° F., proceed through line 168 to second heat exchanger 170 wherein the gases are indirectly cooled by water having a temperature of from about 260° to about 280° F., e.g., about 265° F., fed through line 114 and wherein more of the heat given off during the conversion of $SO_2$ to $SO_3$ in catalytic reactor 164 is reclaimed. Second heat exchanger 170 is preferably a boiler feedwater economizer wherein the water fed through line 114 is heated to a temperature of about 440°-460° F., e.g., about 455° F. The thus heated water leaves the economizer through line 172 and is then fed, through lines 132 and 130, to third heat exchanger 138 and first heat exchanger 156, respectively, and converted into steam. Third heat exchanger 138 is a waste-heat boiler wherein steam having a pressure of from about 600 to 700 psig, e.g., about 650 psig, is generated. The generated steam passes through line 134 to line 140 and, together with the steam in line 136 generated in first heat exchanger 156, is fed to fourth heat exchanger 142 to be converted into superheated steam in line 42, as already indicated.

The cooled gases from second heat exchanger 170 having a temperature of from about 440° to about 460° F., e.g., about 450° F., are passed through line 174 to absorption tower 176 wherein a hot, strong sulfuric acid having a concentration of, for example, 98.6% $H_2SO_4$, and a temperature of from about 220° to about 265° F., e.g., about 260° F., is made by direct contact of the incoming gases with recycle sulfuric acid of slightly lower strength, e.g., of 98.0% $H_2SO_4$, fed through line 178 from dilution apparatus 180. The hot, strong sulfuric acid produced in absorption tower 176 is fed therefrom through line 182 to indirect acid cooler 28 of the integrated system as described above and as illustrated in FIGS. 1 and 2. The cooled sulfuric acid is fed through line 184 and recycled to dilution apparatus 180 wherein it is diluted from a strength of, for example, about 98.6% $H_2SO_4$, to a strength of, for example, about 98.0% $H_2SO_4$, by dilution water fed through line 186. One portion of the diluted sulfuric acid withdrawn from dilution apparatus 180 through line 198 is passed through line 178 and used to absorb incoming $SO_3$ gases from line 174 in absorption tower 176 as explained above. Another portion of the diluted sulfuric acid in line 198 from dilution apparatus 180 is withdrawn from the integrated system through line 36 as product acid. The depleted gases in absorption tower 176 are vented to the atmosphere from the top of the tower through line 188.

The strong, hot (e.g., about 260° F.) sulfuric acid from absorption tower 176 is fed through line 182 and cooled, in accordance with the system of this invention, in indirect heat exchangers or "acid coolers" 28 by chlorine-treated seawater at a temperature of from about 70° to about 100° F., e.g., about 90° F. The chlorine-treated seawater is obtained by treating cold seawater with a chlorine solution. This treatment is provided to prevent marine fouling of the equipment through which the seawater will pass in the system. In the preferred embodiment illustrated in FIG. 1 the water from line 30 used in the indirect acid coolers 28 is obtained by first treating cold seawater introduced through line 32, at around 70° F., with a chlorine solution from line 34, using the chlorine-treated seawater in line 192, at around 70° F., as the cooling medium for some of the miscellaneous cooling operations of the system in miscellaneous equipment coolers 26, and treating the used chlorine-treated seawater with brine fed through line 92. The brine treatment is carried out for a number of reasons, such as to lower the calcium content of the seawater and to increase the density of the mining fluid. These are discussed in more detail below. In any case, any excess water, i.e., water over and above that needed to satisfy the aqueous mining fluid requirements of the mine, is conveniently bled from the system through line 122 prior to the brine treatment. Thus, in the system illustrated in FIG. 1 the chlorine-treated seawater leaves the miscellaneous equipment coolers 26 through line 194 at about 120° F. A portion of this water is bled through line 122, while another portion, fed through line 196, is treated with brine from line 92. The brine treatment lowers the temperature of the water to about 90° F. The brine-treated water is then fed through line 30 to indirect acid coolers 28. Indirect acid coolers 28 are preferably of the shell-and-tube type, and water flows from line 30 through the tubes while acid flows from line 182 through the shell side. The coolers are preferably fabricated of a corrosion-resistant alloy metal, although a fluorinated ethylene-propylene resin, e.g., Teflon, manufactured by E. I. duPont deNemours Co., and a treated carbon-base- or graphite-base material, e.g., Karbate, manufactured by the Cabot Corporation, may be used instead of the alloy. One or more of these indirect heat exchangers or "acid coolers" 28 may be used. In the preferred embodiment of this invention several exchangers are used in parallel to cool the acid to about 170°-185° F., and more preferably to about 180° F. Leaving the acid cooler, the sea-water, which has now been preheated to a temperature of from about 160° to about 190° F., e.g., 180° F., is then sent through line 38 to pH-adjustment apparatus 40 and, subsequently, to low-pressure heater 82 as will be more fully described hereinbelow.

The steam emanating from acid plant 24 through line 42 has a pressure of 575-650 psig, e.g., 600 psig, and a temperature of from about 590° to about 610° TTF., e.g., about 600° TTF. The steam in line 42 is first combined with steam from line 44, which is also a high-pressure, high-temperature superheated steam having a pressure of from about 575 to about 650 psig, e.g., 600 psig, and from about 590° to about 610° TTF., e.g., about 600° TTF. produced in water boiler 46, and is then fed through line 48 to drive turbine-generator unit 52 and turbine-driven equipment 56. Steam is exhausted from unit 52 through lines 58 and 126. Steam exhausts through line 58 at a pressure of from about 85 to about 100 psig, e.g., 92 psig, and a temperature of from about 327° to about 338° F., e.g., 333° F., and through line 126 at a pressure of from about 20 to about 30 psig, e.g., 25 psig, and a temperature of from about 260° to about 275° F., e.g., 267° F. Steam is exhausted from equipment 56 through line 60 at a pressure of from about 20 to about 30 psig, e.g., 25 psig, and a temperature of from about 260° to about 275° F., e.g., 267° F. The steam in lines 58 and 126 results from feeding a portion of the steam from line 48 through lines 144 and 50 to drive turbine-generator unit 52. The steam in lines 60 results from feeding a portion of the steam from line 48 through line 54 to drive turbine-driven equipment 56. A third portion of steam from line 48 is passed via lines 144 and 62 through first pressure reducer 64 wherein its pressure is reduced from about 575-650 psig to between about 85 and 100 psig, e.g., to about 92 psig. A portion of this 92 psig steam leaving first pressure reducer 64 through line 66 is sent through line 68 to be combined with the steam in line 58 from turbine-generator 52. All of the combined steam in line 190 may be fed through line 70 to heat the aqueous mining fluid in high-pressure heater 72. Alternatively, one portion of the steam in line 190 is used in high-pressure heater 72, while another portion is passed, through line 88, to be used for any desired purpose such as to heat the molten sulfur storage tank 20, to heat lines 10, 12, 14, 18 and 22 transporting the molten sulfur to and from storage tank 20, and for other miscellaneous uses. Another portion of the steam from line 66 is fed through line 128 to second pressure reducer 74 wherein its pressure is further reduced to between about 20 and 30 psig, e.g., 25 psig. The steam exits therefrom as low-pressure steam in line 76 and is combined with the steam in line 146, which is the resulting combination of the steam in lines 60 and 126, to form steam having a pressure of from about 20 to 30 psig, e.g., 25 psig, in line 78. One portion of this steam in line 78 is passed through line 80 to heat the aqueous mining fluid in low-pressure heater 82, while another portion is fed through line 84 to deaerating feedwater heater 86. As already mentioned, the steam in lines 58 (from turbine-generator 52) and 68 (from first pressure reducer 64) are combined in line 190 and fed, through line 70, at a pressure of from about 85 to 100 psig, e.g., about 92 psig, to high-pressure heater 72 to heat the aqueous mining fluid to the desired temperature to be used in the Frasch mining operation (e.g., about 315° F.).

The exact configuration and design of the systems of steam lines supplying and exhausting turbine-generator unit 52, turbine-driven equipment 56, low-pressure heater 82, and high-pressure heater 72 may be varied without departing from the concept of the integrated system of the present invention. Thus it will be understood that the exact pressures and temperatures at which the various streams of steam will be generated and will enter and exhaust from the turbines and turbine-driven equipment and from the aqueous mining fluid heaters will depend on the overall heat balance of the system, and may be varied to accomodate different design criteria for any particular type of plant and mining operation, as long at the high-pressure steam in line 48 is reduced in pressure in adequate amounts to serve the requirements of these units by its use as the driving force for turbine-generator 52 and the other turbine-driven equipment 56 and by direct reduction via one or more pressure reducing valves.

As is stated above, the seawater which is partially heated in acid coolers 28 to, for example, about 180° F. is passed through line 38 to pH-adjustment apparatus 40. An optional excess water bleed line (not shown) may be provided to bleed additional water from line 38, prior to the pH-adjustment step, should this become necessary to satisfy the mining fluid requirements of the system. The pH adjustment is provided in order to prevent, or at least minimize, scaling of the heat exchanger tubes of heaters 72 and 82 by the calcium and magnesium salts that may be present in the water. In the pH-adjustment step, the pH of the seawater is lowered from, for example, about 8.0-8.3, prior to adjustment, to, for example, about 6.0-6.7 after adjustment. This may be conveniently accomplished by injection of an aqueous solution of sulfuric acid, or by the addition of any other suitable pH-lowering chemical, such as, for example, $SO_2$ or $H_2SO_3$, through line 90. If an aqueous solution of sulfuric acid is used, however, then sodium chloride brine should be added to the water prior to the pH-adjustment step. This is conveniently done by injecting the brine through line 92 into line 196 prior to feeding the chlorine-treated water to indirect acid coolers 28. Alternatively, the brine may also be injected directly into line 38. The solubility of calcium sulfate in this type of water increases in proportion to the concentration of sodium chloride in solution, and thus the sodium chloride brine should be added in an amount sufficient to insure that calcium sulfate does not precipitate, in any significant amount, upon subsequent heating of the water in pressure heaters 82 and 72. The danger of calcium sulfate scaling is particularly significant in high-pressure heater 72 wherein the water temperature is usually in the neighborhood of 300°-330° F. The reason for this is that the solubility of calcium sulfate in seawater and in seawater-brine mixtures at elevated temperatures is inverse, that is, calcium sulfate becomes less soluble (and thus tends to and does precipitate in increased quantitites) and the temperature of the solution is increased. While the addition of brine to seawater prior to pH adjustment in order to avoid sulfate scaling in pressure heaters 72 and 82 may play an important role in the operation of the system when a sulfuric acid solution is used to lower the pH of the seawater, it will be understood that said addition of brine will not be necessary to control the calcium sulfate scaling problem whenever an excessive amount of sulfate ions is not present in the water entering the pressure heaters. Of course, brine may nevertheless be added to the aqueous mining fluid at this point, or at one or more other convenient points, in order to increase the density thereof and make it a more efficient mining fluid. The use of brine for this purpose should not be confused with its use in the control of calcium sulfate scaling.

The pH-adjusted, partially heated water from pH-adjustment apparatus 40 passes through line 94 and is next treated with a chemical solution fed through line 96 and containing an oxygen-scavenging material such as sodium sulfite. This is necessary in order to render the water less corrosive to the metal surfaces of heaters 72 and 82. The resulting pH-adjusted, partially heated and oxygen-depleted water is fed through line 98 into the tubes of low-pressure heater 82 wherein it is indirectly heated, by low-pressure (e.g., of about 25 psig) steam fed through line 80 into the sheel side of the heater, to a temperature between 250° and 260° F., e.g., 255° F. From low-pressure heater 82, the water at, for example, 255° F., is fed through line 100 into the tubes of high-pressure heater 72 wherein it is heated to the required mining temperature range of 300°–330° F. by steam from line 70 having a pressure of, for example, 92 psig and flowing through the shell side of the heater. From high-pressure heater 72 the water, preferably at around 315° F., is fed through line 102 and delivered to the sulfur wells where it is used as the aqueous mining fluid for the melting of the underground sulfur.

The steam condensate from the shell side of high-pressure heater 72 is trapped and fed through line 104 into the shell side of low-pressure heater 82 wherein it is flashed to the steam pressure therein being maintained. The steam condensate from the shell of low-pressure heater 82 is trapped and fed through line 106 to deaerating feedwater heater 86, to which is also added any necessary make-up water through line 108, low-pressure steam through line 84 and chemicals through line 110. The chemicals are used to scavenge residual oxygen from the water and to adjust its pH from, for example, about 6–7 to, for example, about 8.3–9.0.

From feedwater heater 86 the deaerated, pH-adjusted water is fed through lines 112 and 114 to acid plant 24 to be used as the cooling medium for hot gases within the plant and be converted into high-pressure steam in the plant's heat exchangers, as already explained, and through line 116 to water boiler 46. Water boiler 46 is provided in order to supply the high-pressure steam to line 44, which steam is used during the plant start-up operations and, while in normal operation, during periods of variations or "swings" in steam demand since the acid plant usually operates in a manner which results in a relatively constant steam output. Water boiler 46 may be of the gas-fired type, oil-fired type, or coal-fired type. Fuel is fed to it through line 118, and flue gases which have a temperature of, for example, about 600° F., are discharged through line 120. All, or a portion, of the stream of gases in line 120 may be put through an economizer heat exchanger (not shown) to recover some of the heat contained in the high-temperature gas stream. The recovered heat may be used, for example, to preheat the water fed to boiler 46. In addition, if water boiler 46 is of the oil-fired type, then the flue gases in line 120 will usually contain $SO_2$ as a result of the sulfur content normally found in fuel oil. When this is the case, the flue gases in line 120 may also be used, after passage through an economizer heat exchanger, to adjust the pH of seawater fed through line 38 to pH-adjustment apparatus 40 in place of, or in addition to, the aqueous solution of sulfuric acid or other pH-lowering chemical added thereto through line 90. The use of $SO_2$ (or $H_2SO_3$) for pH-adjustment purposes in this manner is a preferred mode of operation since it allows for adequate pH-adjustment without the danger of scaling caused by the presence of sulfate ions which accompanies the use of sulfuric acid, and at the same time, the $SO_2$ (or $H_2SO_3$) serves as an oxygen scavenger thereby eliminating, or at least minimizing, the need for the addition of sodium sulfite or other oxygen-scavenging material through line 96.

It will be apparent from the foregoing disclosure that the principal interactions giving rise to the integrated sulfur mining-sulfuric acid production system of the present invention are those involving the use of the heat generated in the acid plant, as a result of the exothermic nature of the contact process reactions, in the production of aqueous mining fluid of a sufficiently high temperature to render sulfur molten when the fluid is injected into the underground sulfur-bearing formation in accordance with the Frasch mining technique, and those involving the transfer of heat from the hot acid leaving the sulfuric acid plant absorption towers to the incoming raw water or other aqueous mining fluid in the acid coolers. These interactions are described and emphasized in the above disclosure and in the schematic flowsheets shown in FIGS. 1 and 2 of the preferred embodiment of this invention.

As disclosed hereinbefore, the initial interaction between the aqueous mining fluid and the acid plant waste heat is in the transfer of heat from the hot acid leaving the absorption tower through line 182 at about 260° F., to the aqueous mining fluid, e.g., the chlorine-treated raw seawater, fed into indirect acid coolers 28 at a temperature of about 90° F.

The second interaction in the integrated system of this invention results from the cooling of hot combustion gas and acid gases in waste-heat boilers, boiler feedwater economizers and other heat exchange equipment of the present invention, in the acid plant. This interaction produces large amounts of high-temperature, high-pressure steam in line 42 which is first used to operate turbine-generators 52 and other turbine-driven equipment 56 such as pumps, air compressors, etc., and then used in pressure heaters 82 and 72 to heat the partially heated seawater leaving acid coolers 28 at around 180° F. to the required Frasch mining temperatures of from about 300° to 330° F.

In the above description, acid plant 24 of the integrated system has been described as a single-absorption plant of the type illustrated in FIG. 2. It should be understood, however, that the exact configuration of the sulfuric acid plant contemplated by the present invention is not necessarily that of FIG. 2. Other configurations are well-known to those skilled in the art, and many variations from the scheme shown in FIG. 2 are possible without departing from the concept of the invention. Thus, for example, a double-absorption sulfuric acid plant, that is, a contact process plant wherein two $SO_3$-absorption steps are carried out, may be used if minimizing the emission of sulfur-bearing gases is an important design consideration. Also, whether single-absorption or double-absorption, the exact location and configuration of the heat-reclaiming units of the plant may vary, and a greater or lesser number of waste-heat boilers, superheaters and economizers may be employed than in the scheme shown in FIG. 2. In addition it is not necessary that all of the heat exchangers be provided as separate units. Two or more of the waste-heat boilers of other heat exchangers can be housed within one single unit with separate isolated compartments for separate gas streams. Again, the particular design and configuration of the acid plant may vary substantially, the only requirements being that it be a contact process sulfuric acid plant, that molten sulfur be burned in it, and that it produce a hot, concentrated sulfuric acid.

It will also be understood that the acid concentrations referred to above are those of the preferred embodiment of the invention, and are not intended to limit the scope thereof in any way. Thus, both the "98.0%" sulfuric acid and the "98.6%" sulfuric acid may have a strength ranging anywhere between about 93% and 99% $H_2SO_4$, depending on the design of the particular type of contact process plant used.

Dilution water in line 186 (FIG. 2) can be good quality demineralized water or it can be inexpensive domestic water or clarified raw river water. Make-up water in line 108 (FIG. 1) should be good quality boiler feedwater and may be provided by means of a flash evaporator/condenser or by a fresh water demineralizer (neither shown), or by means of any other suitable sources. In the preferred embodiment, deaerating feedwater heater 86 is constantly maintained at a pressure of about 25 psig.

The present invention contemplates that virtually all of the water used in acid plant 24 in the production of high-pressure steam in line 42 be provided by the stream in line 114 which is made up of deaerated water at a temperature of, for example, about 260°–280° F. produced in deaerating feedwater heater 86. The invention also contemplates that virtually all of the steam needed to operate the integrated system be provided by acid plant 24 and water boiler 46. That is, virtually all of the steam required by the system is provided by the stream in line 48 (FIG. 1) in which is combined the steam in line 42 produced in acid plant 24 and the steam in line 44 produced in water boiler 46. It is significant that, in the system of FIG. 1, the return condensate in line 106 from low-pressure heater 82 provides more than 90% of the water requirements of deaerating feedwater heater 86 which provides the deaerated water in line 112 for use in acid plant 24 and water boiler 46, thus making minimal the make-up water requirements of the system. As described above, any make-up water required is fed into deaerating feedwater heater 86 through line 108.

The integrated system of the present invention is effective in recovering about 12,000,000 Btu per ton of sulfur burned for mining sulfur. In view of the constantly rising costs of energy (an estimated $1.75 per 1,000,000 Btu in 1977), the use of sulfur to produce the energy necessary to heat the aqueous mining fluid and at the same time to produce sulfuric acid makes the integrated system of the present invention economically desirable.

The present invention will be particularly understood by way of the following example which is illustrative only and should not be construed as limiting the invention.

EXAMPLE

Using the integrated system of FIGS. 1 and 2, 949 tons per day of sulfur from storage tank 20 are burned with air in sulfur burner 150 to produce 1,898 tons per day of $SO_2$ gases having a temperature of about 1800° F., and 3,662 tons per day of steam having a pressure of 600 psig and 600° TTF. are generated by the combustion of the sulfur and the conversion of $SO_2$ and $SO_3$ in catalytic converter 164. The $SO_2$ gases at a temperature of 820° F. are catalytically oxidized with vanadium pentoxide in reactor 164 to produce 2,372 tons per day of $SO_3$ gases having a temperature of about 820° F.; 3,699 tons per day of water at a temperature of 455° F. flow out of second heat exchanger 170 through line 172. The cooled $SO_3$ gases exiting the second heat exchanger through line 174 are absorbed in 51,343 tons per day of 98.0% sulfuric acid in absorption tower 176 to produce 53,718 tons per day of 98.6% sulfuric acid having a temperature of 260° F. This hot 98.6% acid is cooled in acid cooler 28 by 41,640 tons per day of chlorine- and brine-treated seawater. After dilution from 98.6% to 98.0%, 2,908 tons per day of the cooled 98.0% acid are sent to storage as product acid, and 51,346 tons per day are recycled to produce additional acid in absorption tower 176. The generated steam in line 42, together with the steam in line 44, is used to drive turbine-generator 52 and turbine-driven equipment 56, and 3,662 tons per day of the exhaust steam therefrom is used to further heat the chlorine- and brine-treated seawater flowing through line 30 in heaters 82 and 72 to a temperature of 315° F. in order to produce 24,360 tons per day of aqueous mining fluid for the integrated Frasch mining operation. 3,109 tons per day of the steam condensate from heaters 82 and 72 are fed to deaerating feedwater heater 86 wherein they are heated to a temperature of 260° F. by 0.08 tons per day of the above-described exhaust steam and then recycled to cool the hot gases in heat exchangers 156, 170, 138 and 142 and to serve as feedwater to boiler 46. Approximately 12,000 Btu are recovered per ton of sulfur burned for mining sulfur.

What is claimed is:

1. An integrated sulfur mining and sulfuric acid manufacturing process which comprises injecting a superheated aqueous mining fluid which is above the melting point of sulfur into an underground sulfur formation to obtain mined sulfur in the molten state, oxidizing said molten sulfur to produce sulfur dioxide, catalytically converting said sulfur dioxide to sulfur trioxide, absorbing said sulfur trioxide in diluted sulfuric acid to obtain an acid of predetermined strength, preheating the aqueous mining fluid by indirect heat exchange with said acid of predetermined strength, producing high pressure steam from deaerated water by indirect heat exchange with the gases from both the oxidation of the molten sulfur to sulfur dioxide and the catalytic conversion of said sulfur dioxide, generating electrical and mechanical energy with at least a portion of said high pressure steam, heating the preheated aqueous mining fluid to obtain said superheated aqueous mining fluid by indirect heat exchange with the exhaust steam from said energy generation, said exhaust steam being condensed during said heating of the preheated aqueous mining fluid to form a condensate, deaerating said condensate in a deaerating feedwater heater, recycling at least a portion of said deaerated condensate for said production of high pressure steam, recycling the remaining portion of said deaerated condensate to a water boiler to produce high pressure steam, and combining the high pressure steam produced in the water boiler with the high pressure steam produced in said indirect heat exchange with said gases to form a combined stream of high pressure steam.

2. The process according to claim 1 wherein the high pressure steam produced in said indirect heat exchange with said gases and the steam produced in said water boiler has a pressure of from about 575 to about 650 psig.

3. The process according to claim 1 wherein said exhaust steam has a pressure of from about 20 to 100 psig.

4. The process according to claim 1 wherein said acid of predetermined strength is cooled from a temperature in the range of about 220° to about 265° F. to a temperature of between about 170° to 185° F. and said aqueous mining fluid is preheated to a temperature of between about 160° and 190° F.

5. The process according to claim 1 wherein said aqueous fluid is seawater.

6. The process according to claim 1 wherein said aqueous mining fluid is heated to a temperature of between about 300° and 330° F.

7. The process according to claim 1 wherein a portion of said exhaust steam is added to said deaerating feedwater heater for heating of said condensate.

8. The process according to claim 1 wherein a portion of said combined stream of high pressure steam is used to generate said electrical and mechanical energy, and the remaining portion of said combined stream is reduced in pressure and then added to said exhaust steam to obtain steam of lower pressure.

9. The process according to claim 8 wherein the condensate obtained from the indirect heat exchange between the preheated aqueous mining fluid and said steam of lower pressure provides more than 90% of the water requirements of said deaearting feedwater heater.

* * * * *